United States Patent [19]

Clendenin et al.

[11] 4,386,848
[45] Jun. 7, 1983

[54] OPTICAL TARGET TRACKING AND DESIGNATING SYSTEM

[75] Inventors: Ralph M. Clendenin; Raymond S. Freeman, both of Orlando, Fla.

[73] Assignee: Martin Marietta Corporation, Bethesda, Md.

[21] Appl. No.: 177,039

[22] Filed: Aug. 11, 1980

[51] Int. Cl.³ .................... G01C 3/08; F41G 7/00; F41G 1/40; F41G 7/22
[52] U.S. Cl. .................... 356/5; 89/41 L; 244/3.13; 244/3.16; 356/152; 350/500; 350/314; 350/254; 358/125
[58] Field of Search ............. 89/41 L; 244/3.13, 3.16; 356/5, 141, 152; 358/125; 350/16, 38, 39, 422, 314, 315, 254

[56] References Cited

U.S. PATENT DOCUMENTS

| | | | |
|---|---|---|---|
| 3,316,348 | 4/1967 | Hufnagel et al. | 358/109 |
| 3,631,775 | 1/1972 | Tido | 350/254 |
| 3,715,953 | 2/1973 | Allan | 356/152 |
| 3,742,812 | 7/1973 | Woodworth et al. | 358/125 |
| 3,833,282 | 9/1974 | Kappl et al. | 350/39 |
| 3,926,525 | 12/1975 | Sheldrick | 350/314 |
| 4,027,968 | 6/1977 | Spence-Bate | 350/254 |
| 4,108,551 | 8/1978 | Weber | 356/152 |
| 4,155,096 | 5/1979 | Thomas et al. | 356/152 |
| 4,173,414 | 11/1979 | Vauchy et al. | 89/41 L |
| 4,195,799 | 4/1980 | Sogo et al. | 244/3.16 |

FOREIGN PATENT DOCUMENTS

2322631  3/1974  Fed. Rep. of Germany ..... 244/3.16

*Primary Examiner*—S. C. Buczinski
*Attorney, Agent, or Firm*—Julian C. Renfro; William J. Iseman; Gay Chin

[57] ABSTRACT

An optical sight system having in combination: a sight assembly (10), including a stabilized mirror (12, 14), a laser designator (24), a laser ranger (26), a common optical system (16), a television optical system (20), and a television camera (22); a control panel (50), including manual control (52, 67, 79), range, azimuth and elevation readouts (75, 76, 77), electronic servo control circuits (56), and light level/field of view electronic control circuits (58); and display (60) including television tracker and video circuits (54). A target may be located manually and tracked automatically by television tracker circuits (54). Range to the target may be determined by laser ranger (26) and the target illuminated by a laser spot from laser designator (24) to permit use of guided ordnance to attack the target. The sight assembly (10) by virtue of integration of an optical bed (11) with the elements of the assembly is very lightweight to permit mounting on a mast (5) above the plane of a helicopter rotor.

20 Claims, 11 Drawing Figures

OPTICAL TARGET TRACKING AND DESIGNATING SYSTEM

TECHNICAL FIELD

The present invention relates to optical sights and more particularly to optical sights for mounting on military aircraft, vehicles, and the like for acquiring a target, tracking the target, and designating the target with a laser spot for use with laser guided ordnance.

BACKGROUND ART

Present day weapon systems make wide use of a laser designator in which a forward observer visually locates a military target and then directs a coded laser beam at the target. The observer coordinates with a weapon delivery system to direct ordnance toward the target. Such ordnance would include a guidance system which would recognize the laser spot and guide the ordnance into the target. This designation activity may be carried on by ground personnel on foot or in vehicles. However, a more efficient operation may be performed with the means of scout helicopters. In prior known helicopter systems, visual scouting and location of targets exposes the entire helicopter and crew to the enemy, resulting in very high vulnerability.

Systems have been proposed in which the observer may be hidden from the enemy and the target located through a television system. In one proposal, a sight is to be mounted on a mast projecting above the helicopter rotor plane such that the aircraft could remain behind masking foliage or terrain with the mast-mounted sight projecting far enough above the television camera to locate the target. While an attractive concept, the implementation of this type of system has presented many problems. For example, it is necessary to stabilize the optical elements of the sight because of the natural movements of the helicopter. To stabilize the entire sight would require relatively heavy servo motors and the like. An alternative approach is to utilize a rigid sight with only the optical elements stabilized which could be accomplished with lighter elements.

The ruggedness required for a sight to be mast mounted above the rotating helicopter blades with the necessary stabilization raises a major problem of weight reduction since rugged, stabilized systems known in the prior art have proved to have excessive weight for this application. Additionally, it is necessary to combine the television system which provides the visual location of a target with a laser designation system to permit designation of the target after it is located. The highly collimated laser beam generally produces a very small spot and is therefore very sensitive to motion if it is to be maintained on target. Thus, very close stabilization is required.

DISCLOSURE OF INVENTION

The present invention is a lightweight, rugged and highly stable sight combining a television system for visual acquisition of a target with a laser designation and ranging capability, with the television system also providing for automatic tracking of the target. The invention includes a lightweight sight assembly that may be mast mounted above the plane of the rotors of a helicopter without affecting the performance of the aircraft. The system includes the sight assembly rotatably mounted on a mast and having an aerodynamic housing. An optical bed is disposed in the housing and mounts a gyro stabilized mirror assembly, a laser designator and ranger assembly, and a TV camera. One optical system is provided, common to the laser and TV camera, while a second optical system is utilized by the TV camera. A control panel assembly along with electronic units may be mounted in the cabin of a helicopter for use by the operator. The electronics portion contains electronic controls for the tracking system, electronic controls for servos which control the movement of the sight components for locating targets, stabilizing the optical system, and for automatic tracking of a target. The control panel includes a television monitor screen, system control switches and indicators, and manual control knobs. Also, visual displays of the line of sight attitude of the sight assembly, and the range to a target are provided. Additionally, a manual track joy stick is provided which permits the operator to control the sight assembly manually when desired.

A number of novel structures are provided in the sight assembly which have, in combination, permitted the required lightweight to be achieved. First, the laser optical system and camera optical systems have been integrated to a major extent. Also, the optical bed has been utilized to highly integrate the discrete elements of the sight assembly to thereby minimize the weight of supporting structures necessary in prior art assemblies. The aerodynamic housing has an optical window in its forward end at right angles to its fore and aft axis. Directly behind the optical window is a gyro stabilized mirror. The optical bed includes support brackets for mounting a first gimbal of the stabilization gyroscope thereby eliminating the usual case and mounting elements needed in prior art systems. A second gimbal is pivotally mounted in the first gimbal and contains the two gyroscopes. The mirror is also pivoted in the first gimbal and is operatively connected to the second gimbal by means of a steel band-type belt and pulleys. The axis of the first gimbal is transverse to the fore and aft axis of the housing and provides an elevation axis for the gyroscope while the second gimbal has its axis disposed vertically providing an azimuthal axis. Therefore, the gimbaled mirror may be rotated in both azimuth and elevation. However, the mirror has limited angular capability in the azimuth direction which may be, for example, ±2° which is sufficient to remove residual pointing and stabilization errors because of movement of the housing and azimuth. When azimuth motion greater than 2° is required, the entire assembly may be rotated about the mast over an angle of ±160°. The mirror may be rotated in elevation, over an angle of ±15°.

A laser designator and a laser ranger are mounted on the optical bed. The optical path through the housing window from the gimbaled mirror and to the laser designator and ranger passes through a dichroic beam splitter which is essentially transparent to the laser frequency energy and reflective to visible light. Therefore, an optical image incident on the mirror will be reflected by the beam splitter and transmitted via the television optical system to the camera. The television optical system includes a fixed narrow field of view (NFOV) lens assembly, a neutral density filter having adjustable light transmission characteristics and a movable wide field of view (WFOV) lens assembly. The filter is a disc which may be rotated to vary the light transmission and may be controlled automatically by the video circuits in the electronics unit to maintain optimum contrast of the television scene. The WFOV lens assembly is moved out of the path to provide a narrow field of view for the television system. When a wide field of view is desired, such as during target location, the WFOV lens assembly is moved into the optical path.

A novel feature of the television optical system which advantageously greatly reduces the weight of the sight assembly is the use of a single drive motor for the filter disc and for the movable WVOF lens assembly. A small, lightweight motor drives the filter disc through a gear train with the motor being mounted on one end of a balanced rocking arm pivoted about the axis of the filter disc. The opposite end of the rocking arm mounts the WFOV lens assembly. An indexing mechanism operated by a solenoid holds the rocking arm in either of two positions, in one of which the WFOV lens assembly is in the camera optical path and the other position in which the WFOV lens assembly is out of the optical path.

A clutch unit is coupled to the filter disc and utilized as a brake when the clutch is engaged. During normal operation, the solenoid is not energized and the rocking arm is locked in one of the indexed positions, the filter disc clutch is disengaged and the motor when energized will therefore rotate the filter disc. When the operator wishes to change the field of view of the optical system, the solenoid is operated which simultaneously engages the clutch unit, braking the filter disc, and disengaging the indexing mechanism. In this condition, when the motor is energized, the gear connected to the filter disc is held stationary and therefore the motor gear train will cause the motor and rocking arm to "walk" around the stationary filter disc gear. This movement of the arm will bring it to the other index position at which point a limit switch will release the solenoid, causing indexing of the arm in the new position and causing the drive motor to stop. Advantageously, the switching operation may take place in a fraction of a second and therefore will not interfere with the normal automatic operation of the filter disc.

Rotation of the entire sight assembly is accomplished by a small motor and gear train in a pedestal mounting the sight assembly to the mast.

The electronics units which may be mounted in the fuselage of the helicopter include the video electronics unit and the servo electronics unit. An operator's control panel is provided having cathode ray tube television display with crosshairs in the center of the screen framed by a rectangular tracking window. Automatic tracking circuits in the video electronics unit control the rectangular tracking window of the display to be centered on a selected target. The circuits sense the difference in contrast between the target and the background, and provide control signals to the servo electronics unit. The servo electronics unit sends control signals to the torquer motors on the gyroscope in the sight assembly and to the azimuth drive motor to cause the sight assembly and the stabilized mirror to track the target. The laser beam is centered within the crosshairs which represent the line of sight of the sight assembly. Thus, when a target is maintained centered in the tracking window, operation of the laser designator will cause a laser spot to be placed directly on the target.

To assure that the laser beam is properly aligned with the center of the crosshairs, a novel boresighting system is provided. The sight assembly includes a small corner reflector which has the characteristics of reflecting a laser beam at a 180° angle regardless of its angle of incidence with respect to the reflector. When the sight system is first turned on, a boresight routine causes the stabilized mirror to be rotated against its mechanical stops which results in the laser designator beam being reflected from the stabilized mirror to the corner reflector back to the stabilized mirror and thence to the beam splitter where a small percentage of the laser beam is reflected into the television optical system. The laser spot therefore produces a video signal in the video electronics unit. Boresight circuits therein will automatically vary the raster position so as to exactly center the laser spot. The operator may also manually initiate the automatic boresight procedure at any time required.

The servo electronics unit also receives signals from the azimuth and elevation pickoffs of the stabilizing gyroscope in the sight assembly. Thus, any deviation of the housing which would tend to move the line of sight of the sight assembly in space will result in control signals which operate the torquer motors to maintain the mirror in the proper attitude.

The video electronics unit is also utilized to sense the contrast of the televised scene and to automatically control the variable density filter in the sight assembly to maintain maximum contrast between the target and the background.

A joy stick is provided at the operator's position and includes switches which may be operated by the thumb and fingers of the operator to permit manual target tracking in azimuth and elevation, to change the tracker polarity depending on whether a target is very dark or very light, to momentarily change the field of view of the television system and to operate the laser designator and the laser ranger. Digital readouts are provided on the control panel to indicate range, line of sight bearing in azimuth, and line of sight angle in elevation.

It is therefore a principal aim of the invention to provide an optical target locating, tracking, and designating system having a very light sight assembly capable of being mast mounted above the plane of a helicopter rotor.

It is another aim of the invention to provide such a system in which the sight assembly includes a laser designator and ranger, and a television camera having the laser beam automatically centered within the field of view of the television camera.

It is yet another aim of the invention to provide a sight assembly which is gyroscopically stabilized to maintain the line of sight assembly fixed in space.

It is still another aim of the invention to provide a sight assembly having a minimum possible weight by integrating the elements thereof into an optical bed, and by limiting gyro stabilization to a single stabilized mirror.

It is a further aim of the invention to reduce the weight of the sight assembly by integrating an automatic light level control system with a change of field of view mechanism so as to require a single motor for operation of both functions.

It is yet a further aim of the invention to provide means for boresighting the laser beam with the center of the field of view of the television camera automatically by reflection of the laser designator beam into the television camera during such adjustment.

It is still a further aim of the invention to provide operator controls whereby the operator may select manual or automatic tracking of a target by the system and may manually control the position of the line of sight of the sight assembly in space.

These and other aims and advantages of the invention will become apparent from the following description of the best modes for carrying out the invention when read in light of the drawings.

BEST MODE FOR CARRYING OUT THE INVENTION

Figure 1:
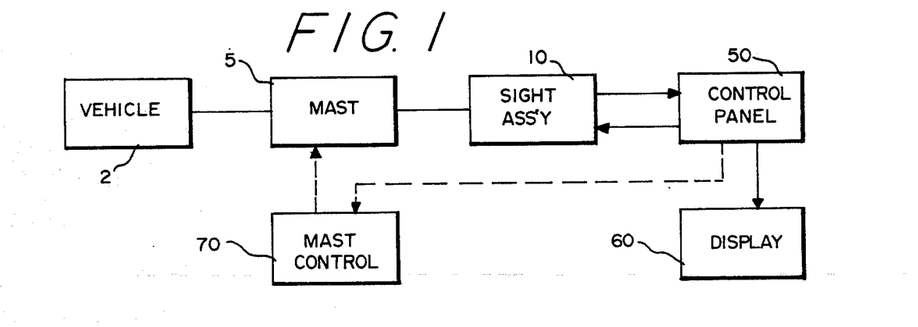
FIG. 1 is a greatly simplified block diagram showing the major elements of the invention.

The mast mounted TV/laser sight system of the invention is applicable to a number of scenarios. However, the basic elements of the system will be the same in all applications. Turning to FIG. 1, a block diagram of elements of the invention are shown with reference to a particular installation such as vehicle 2. Vehicle 2 may be a helicopter, a tank, or other land type vehicle, or may represent a fixed building or the like. In each installation a mast 5 is provided to elevate a sight assembly 10 above elements of the terrain. Sight assembly 10 contains a laser system and a television camera system as will be explained below. Control panel 50 and display 60 are collocated at the operator's position which may be, for example, in the cabin of a helicopter. The operator, through the use of control panel 50, may control the sight assembly manually to initiate tracking or to place sight assembly 10 into an automatic mode for automatic tracking and to perform other functions. The intelligence gathered by sight assembly 10 is received by control panel 50 and communicated to display 60 which utilizes a television screen on which the target area, the target, and a laser spot may be seen. An optional mast control 70 is indicated which is required in fixed ground installations and in ground based vehicles in which an extensible mast is used to support sight assembly 10.

Figure 2:
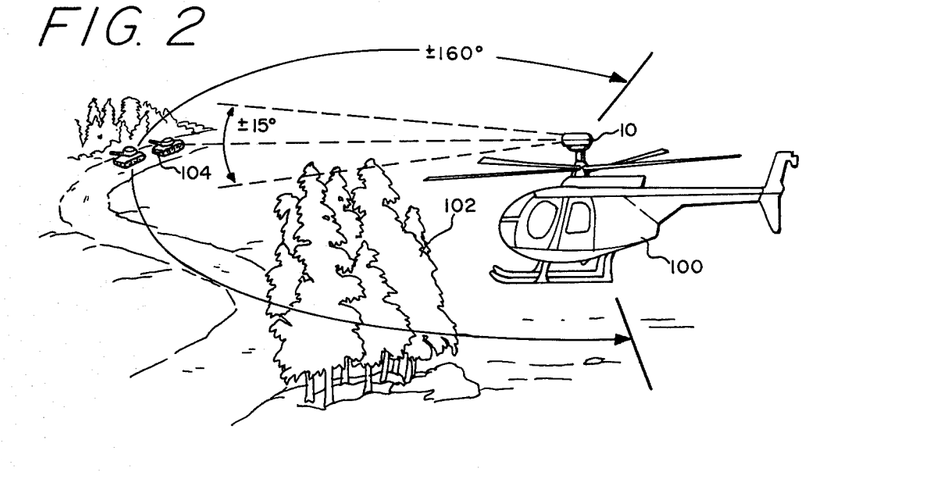
FIG. 2 is a perspective view of a helicopter having the invention installed therein tracking a military tank and designating that target.
Figure 3:
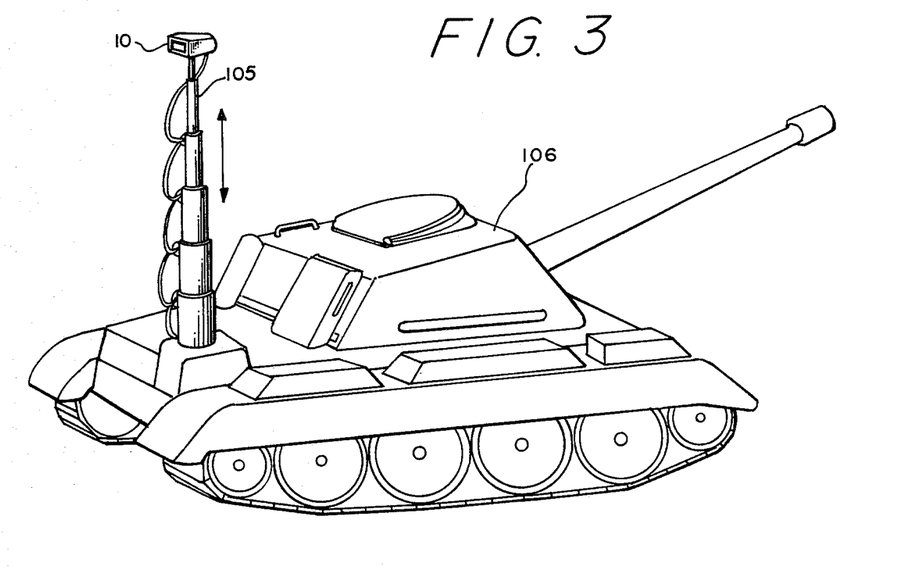
FIG. 3 is a perspective view showing an alternative mounting of the invention in a tank, with the sight assembly mounted on an extensible mast for raising over foreground obstructions.

FIGS. 2 and 3 show two typical applications of the invention. When used in a helicopter 100 as shown in FIG. 2, sight assembly 10 is advantageously mounted on a short mast projecting above the rotor blades as indicated. Helicopter 100 may hover behind natural terrain features such as trees 102 with sight assembly 10 being able to locate and track the target such as tank 104. One embodiment of the invention provides for tracking of a target over ±160° in azimuth and ±15° in elevation as indicated in FIG. 2. FIG. 3 illustrates the application of the mast mounted sight of the invention adapted to a tank 106 and having an extensible mast 105, mounted to a tank 106 and shown in a partially extended position. As indicated by FIG. 1, the system would, in this instance, include a mast control 70 for elevating sight assembly 10 to a desired height to see over obstructions for target location and tracking.

Figure 4:
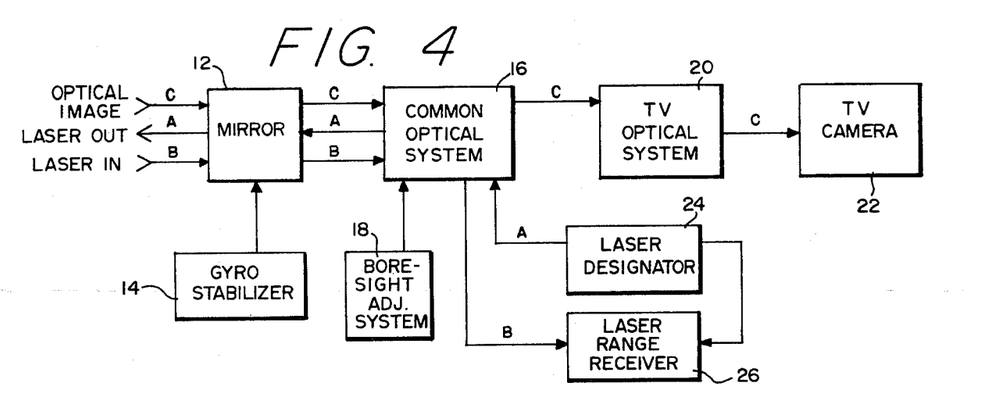
FIG. 4 is a functional block diagram of the sight assembly of the invention.

Referring now to FIG. 4, a functional block diagram of the sight assembly 10 in accordance with the invention is shown. Sight assembly 10 includes two separate systems: a laser designator/ranger 24, 26 system; and a television camera pickup system 20, 22. These and the other elements of sight assembly 10 are installed on a rigid optical bed to be described later. A common optical system 16 is mounted on the optical bed which carries light to and from the laser system and to the TV system. To permit motion of the vehicle, a final exit mirror 12 is stabilized by gyrostabilizer 14 which permits the optical bed and housing to move relative to the mirror 12 over a limited range while mirror 12 maintains the line of sight fixed in space. Laser designator 24 produces coded laser pulses as is conventional for a military laser designator system. Indicated by line A, these pulses are transmitted via common optical system 16 and mirror 12 toward the desired target. General illumination of the target area by ambient lighting permits television camera 22 to produce a television picture of the scene. The optical image is reflected by mirror 12 through the common optical system 16 to TV optical system 20 to TV camera 22 as indicated by line C. A crosshair presentation in the center of the television frame in the display 60 may be utilized for aiming. The boresight of the system is adjusted such that the laser spot from laser designator 24 on a target will occur exactly at the boresight crosshair location on the television screen. Boresight adjustment element 18 is provided to permit accurate adjustment of the system to cause laser beam A to be centered in the crosshairs. In addition to receiving optical images from the scene, the reflection of the laser pulse from laser designator 24 on output line A striking the target will be received by mirror 12 as indicated in line B and will be directed to laser ranger 26 via common optical system 16. Ranger 26 may, by measuring the delay between the transmitted designator pulse and the received ranging pulse, measure the distance from the vehicle to the target.

Figure 5:
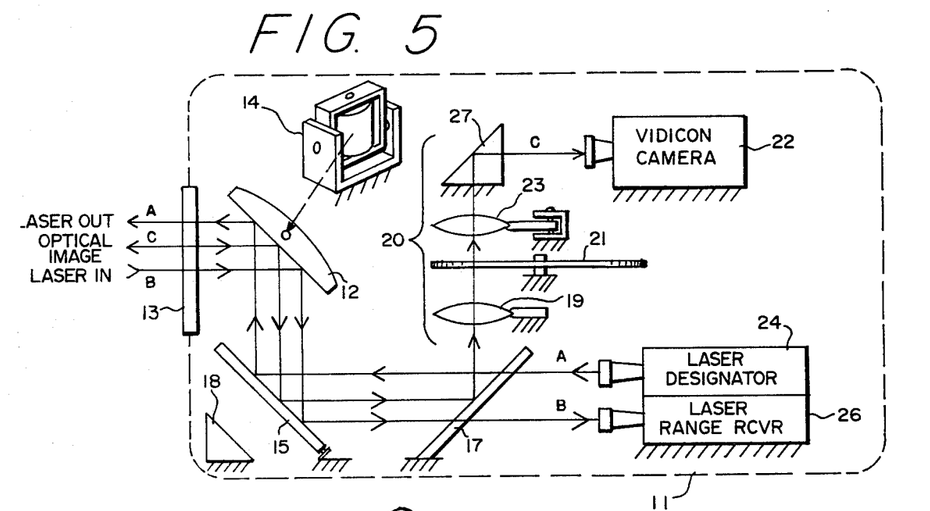
FIG. 5 is a simplified and partly functional diagram of the sight assembly showing an approximate arrangement of components.

A simplified diagram of the mechanical elements of sight assembly 10 may be noted with reference to FIG. 5. Here, the rigid optical bed is indicated by the dashed box 11 with the fixed elements indicated by the ground symbols. A gyro assembly 14 is shown rigidly attached to optical bed 11 and used to stabilize mirror 12 as indicated by the dashed line. An optical window 13 is provided in the assembly which is completely enclosed to prevent contamination. As indicated by the beam tracing lines, the output from laser designator 24 (line A) first traverses a dichroic beam splitter 17, is then reflected by adjustable mirror 15 to gyro stabilized mirror 12 and thence through window 13 to the target. The laser return shown by ray trace line B enters through optical window 13 and is reflected from stabilized mirror 12, by adjustable mirror 15 and through dichroic beam splitter 17 to laser ranger 26. The optical image indicated by ray trace line C is reflected from mirrors 12 and 15 to dichroic splitter mirror 17, which then reflects the light through TV optical system 20, which may include fixed lens system 19, a movable lens system 23, an optical filter system 21, and prism 27 to vidicon camera 22. The lens system indicated diagrammatically by lens 19 is a narrow angle element fixed in place and rigidly mounted to optical bed 11 which provides a narrow field of view (FOV). Filter 21 is a neutral density filter wheel which is used to maintain an optimum light level at camera 22. The filter may be manually controlled or used in an automatic (ALC) mode under control of a servo loop to vary the density of the filter as the external light level changes. Lens 23 represents diagrammatically a wide angle FOV optical assembly which is arranged to be moved into the optical path for the TV camera 22 for initial target search and is adapted to be swung out of the path after designation of a target to leave only the narrow FOV lens system 19 in operation.

As mentioned above, it is necessary that the beam from laser designator 24 be centered with respect to the boresight of the TV display generated by vidicon 22. A boresight adjustment may be made with the aid of corner reflector 18. A corner reflector, such as reflector 18, as is well known, has a characteristic that it will direct a collimated beam back 180° from the angle of arrival. Therefore, mirror 12 is temporarily rotated against a mechanical stop to cause laser beam A to be reflected toward corner reflector 18 which will reflect the received beam back along its path of arrival and will strike the face of mirror 15 at the same point as the beam from laser designator 24. The geometry of the assembly is arranged such that this reflected beam is sent to dichroic beam splitter 17 which reflects a small fraction of the beam through optical system 20 to vidicon 22. The operator will see the laser spot in approximately the center of the display 60. Camera 22 is provided with controls in the electronic portions of control panel 50 to electronically adjust the position of the TV frame with respect to the laser spot to thereby center the spot on the crosshairs of the TV display. Provision also may be made to have the boresight adjustment made automatically through a servo type system. In such operation, when the system is first energized, it will automatically adjust or trim the boresight and the correction will be stored in digital form. Additionally, the operator may at any time initiate a re-boresight. After the boresight operation, mirror 12 is returned to its normal position.

Figure 6:
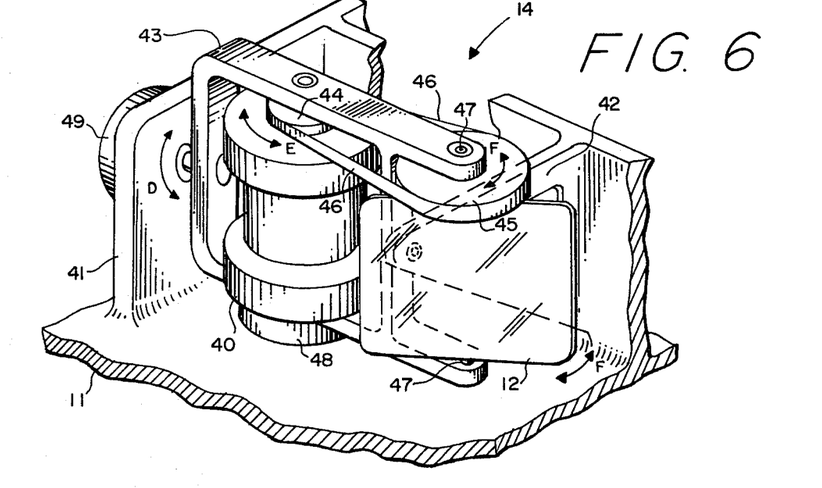
FIG. 6 is a fragmentary portion of the optical bed showing the integration of the gyrostabilizer into that bed and indicating the stabilized mirror.

To be able to mount sight assembly 10 of the invention on a mast above the blades of a helicopter and at the top of a tall mast it is essential that the weight be minimized. To this end, the sight assembly advantageously utilizes a novel optical bed 11 in which supporting frames and ribs are disposed which provide the required rigidity of the optical elements by integrating the optical bed 11 and the supports. To illustrate such integration, FIG. 6 shows a simplified representation of the mirror 12 with its gyro stabilizing system 14 as supported by brackets 42 and 41 integral with the improved structure of optical bed 11. Gyro stabilizing assemblies are known in the art but in the past have been available only as a complete unit having an external framework with sufficient strength and mass to support the gimbals, gyro elements, torque motors, pickoffs and other elements of the gyro assembly. Such prior art units were not suitable for the preferred implementation of the present invention due to their excessive weight. As shown in FIG. 6, a pair of support brackets 41 and 42 are cast into the base plate 11 and are strengthened with webbing and appropriate reinforcements, thereby providing sufficient rigidity with a fraction of the mass and weight required in the prior art units. Gyro assembly 14 consists of gimbal 43 pivoted about a central axis through brackets 42 and 41. The elevation axis of gimbal 43 is transverse to the sight assembly 10 wherein window 3 (FIG. 5) is considered to be the front of the sight assembly 10. Inner gimbal 40 is mounted to outer gimbal 43 with its axis vertical representing the azimuth axis. The inner gimbal contains the aximuth sensing gyroscope and the pitch sensing gyroscope. An elevation pickoff and torquer 49 is associated with the elevation gimbal and an azimuth pickoff and torquer 48 is associated with the azimuth gimbal. The aximuth axis has a capability of moving ±2° which is sufficient to remove residual line-of-sight errors caused during azimuth disturbance rotations of the optical bed 11. As previously mentioned, the turret drive on the azimuth has a range of ±160° which is driven in response to signals from the azimuth gimbal axis pickoff to keep the inner axis within its ±2° of freedom. When a change in azimuth is commanded, the rate of rotation is up to 40° per second but will slew one radian per second in the stabilized mode to accommodate the aircraft yaw rates. The elevation gimbal has a freedom of ±15° which may extend to 45° with 50% vignetting. When a change in elevation is commanded, the rate of movement of the elevation gimbal is up to 15° per second and will accommodate aircraft pitch rates of one radian per second.

As may be recognized from FIG. 6, stabilized mirror 12 is pivoted on bearings 47 and is controlled from inner gimbal 40 via taut steel band 46 on pulleys 44 and 45. As gimbal 40 rotates about its axis in response to torquer 48 as shown by arrow E, mirror pulley 45 will be rotated as shown by arrows F.

Figure 7:
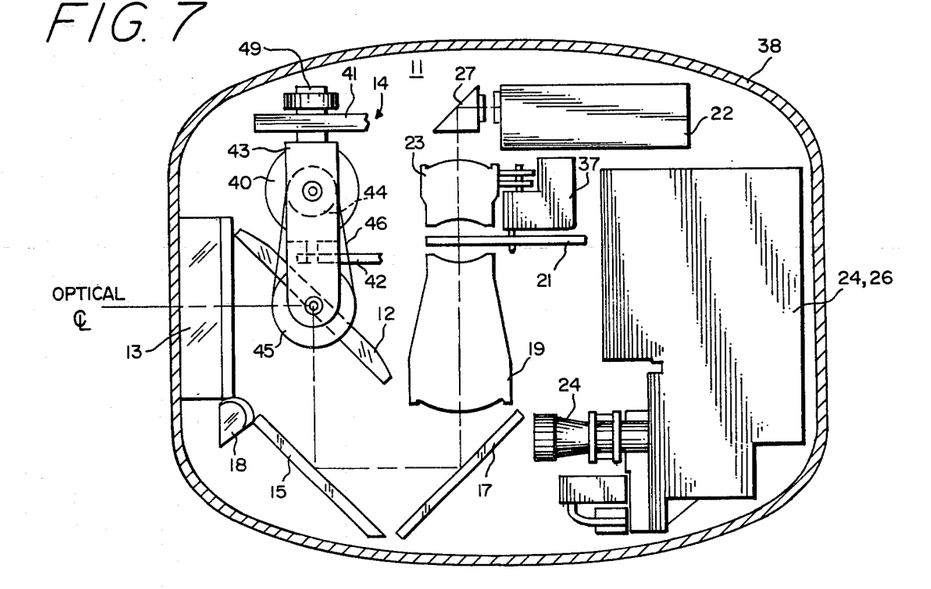
FIG. 7 is a top view of the sight assembly with the housing removed showing a typical layout of the physical elements.

The physical arrangement of the elements of sight assembly 10 may be noted from the top view of the preferred embodiment of FIG. 7. An outer rolled edge 38 of optical bed 11 is indicated in cross-section. The optical window 13 may be seen at the front of the assembly with the optical center line indicated by the broken dashed line. Stabilized mirror 12 may be noted stabilized by gyrostabilizer 14. The optical center line is shown reflecting from adjustable mirror 15 and dichroic beam splitter 17 through the TV optical system including narrow FOV optics 19. Next, in the optical path is filter disc 21 having a continuously variable neutral density filter characteristic over a range from 0 to 3 in density which provides a dynamic illumination range of 1,000 to . Filter wheel 21 has a spectral transmission range of 0.68 to 1.1 microns which extends into the near infrared. This enhances the contrast of scenes in which infrared reflective vegetation is present. Filter wheel 21 is controlled by drive assembly 37 having a drive motor, a solenoid, and a potentiometer for position control for boresighting. The operation of drive unit 37 will be described in more detail below and may be controlled either manually or automatically to control filter wheel 21 to a selected illumination level for camera 22. Next in the optical path is wide angle lens assembly 23. The field of the view of the system with only the narrow field of view lens 19 effective is 2.5°. With the wide angle field of view lens assembly 23 in effect, the field of view is increased to 10°. Wide angle lens assembly 23 is movable and may be driven from motor drive unit 50 to be in the optical path for camera 22 or to be out of the path thereby switching from the wide field of view to the narrow field of view. Filter and prism assembly 27 is next in the optical line and directs the incoming image into vidicon camera 22.

Preferably, a high resolution camera is used, for example, an 875 line, 30 frames per second, 2 to 1 interlace television camera provides satisfactory resolution. Camera 22 thus converts the near-infrared imagery of the target scenes within the field of view of the unit into a video signal which is transmitted to the TV display. The camera may use a silicon target vidicon which in combination with a filter on prism 27 and the filter wheel will have a response of 0.65 to 1.1 micron. The camera circuitry allows adjustment of the scanning raster position horizontally and vertically for boresight control. The camera electronic circuits are also adapted to permit only the center ½ of the field of view to be scanned. In conjunction with this electrical underscanning and the wide field of view and narrow field of view optical fields, four fields of view are available, 10°, 5°, 2½°, and 1.25°.

The laser system consisting of designator laser 24 and ranging receiver 26 are mounted at the rear portion of the assembly with the input lenses mounted vertically one above the other, back of the dichroic beam splitter 17. The beam splitter 17 will reflect energy at 0.7 to 0.9 microns for the TV optical path and will transmit energy at 1.06 microns which is the laser light wave length for laser designation and ranging. Adjustable mirror 15 is fabricated from beryllium. When stabilized mirror 12 is in its boresight position against the mechanical stops, it will reflect the laser beam from designator 24 to corner reflector 18 then from reflector 18 back in the reverse direction to dichroic mirror 17 which reflects part of the energy through the TV optical system into camera 22. The electronic scanning raster position circuitry may be then controlled to center on the reflected laser spot to achieve boresight. These circuits are arranged to automatically adjust the boresight when the unit is first turned on, and under control of the operator, may also be commanded to re-boresight the system whenever advisable.

Figure 8:
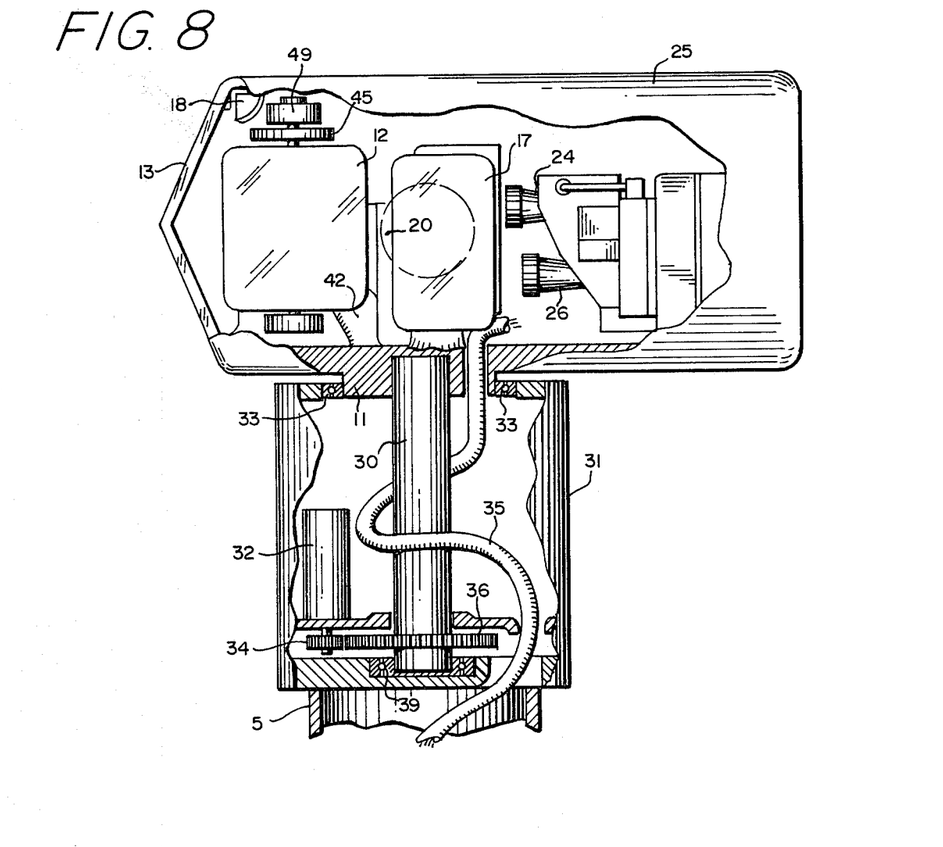
FIG. 8 is a side view of the sight assembly of FIG. 7 partially cut away to further show the physical relationship of the elements including the azimuth drive mechanism.

As previously mentioned, sight assembly 10 may be scanned ±160° in azimuth. FIG. 8 provides a partially cut away and cross-sectional view of sight assembly 10 disclosing the azimuth drive mechanism. The upper portion of the sight is enclosed in a streamlined housing 25, shown partially cut away with optical window 13 at the front end. (Mirror 15 has portions of the gyro structure.) Dichroic beam splitter 17 is shown in front of the television camera optical assembly 20. An umbilical cable 35 is seen which connects to the various electrical elements in the sight section. Drive section 31 is provided with azimuth drive motor 32 which includes a brake and a tachometer. Drive motor 32 is coupled to shaft 30 by pinion gear 34 and drive gear 36. A ring bearing 33 and a shaft support bearing 39 are shown which mount the turret unit.

Figure 9:
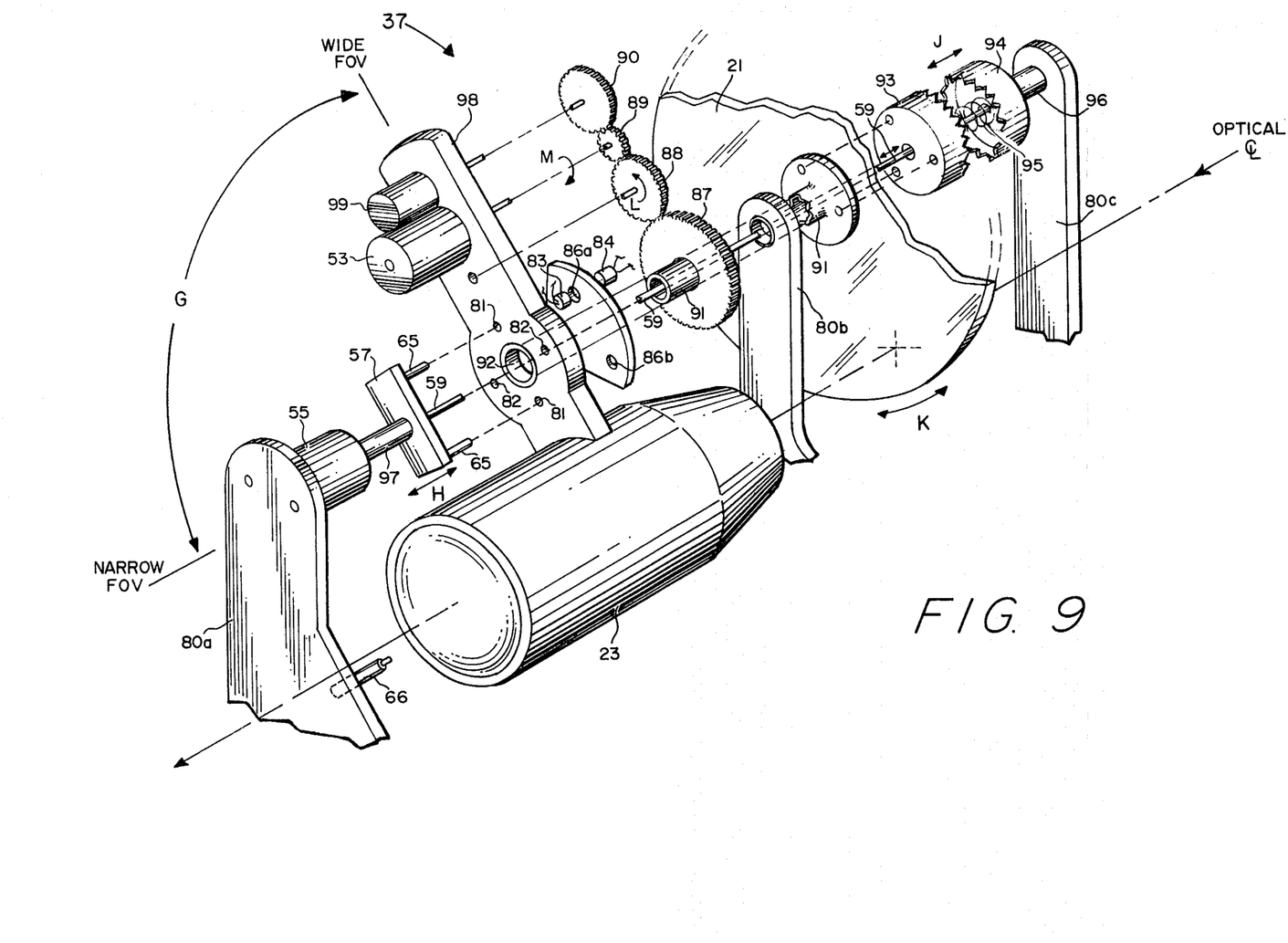
FIG. 9 is a simplified exploded view of the automatic light filter control mechanism and the change of field of view mechanism.

Details of the motor drive assembly 37 which operates both the neutral density filter wheel 21 and the wide field of view (WFOV) optical assembly 23 is shown with reference to FIG. 9. As previously discussed, weight is a critical parameter of the invention with respect to a mast mounted sight. Advantageously, a novel dual purpose motor control 37 is used to operate neutral density filter 21 and also to move WFOV optical assembly 23 from a non-operative to an operative position and vice versa. Thus, significant saving in weight is achieved over the use of a separate drive system for each element. A simplified and exploded view of the motor drive system 37 with the filter 21 and WFOV lens assembly 23 is shown. Some parts have been cut away and certain supporting structures are omitted for clarity. Neutral density filter wheel 21 at the front of the assembly is mounted to a rearwardly projecting short hollow shaft 91 shown in exploded view. Hub and shaft 91 rotate in a suitable bearing in center support 80b. Drive gear 87 is attached to hollow shaft 91 and, as will be described, serves to drive filter disc 21 to a desired position. A clutch cup 93 is attached to the front surface of filter disc 21, colinear with shaft 91. A mating clutch cup 94 is mounted facing disc clutch cup 93. Clutch cup 94 is slidably mounted on hub 96 which is rigidly attached to front support 80c. The facing rims of clutch cup 93 and 94 are serrated such that the teeth thereof may engage. Cup 94, slidably disposed on hub 96, is held apart from filter disc cup 93 by spring 95. Operating rod 59, which extends through and concentric with shaft 91 and through clutch cups 93, 94 is connected to slidable cup 94. Operating rod 59 is connected to the armature 97 of solenoid 55 mounted on rear support 80a. As will be noted, armature 97 of solenoid 55 is also connected to bar 57 which supports latch pins 65. When armature 97 of solenoid 55 is in its non-operated position, plate 57, latch pins 65 and rod 59 are in a forward position and clutch cup 94 is disengaged from clutch cup 93. When solenoid 55 operates, rod 59 draws clutch cup 94 rearward as shown by arrow J into engagement with clutch cup 93. This action also draws pins 65 rearward as shown by arrow H. Clutch cup 94, although slidable on hub 96, is keyed and therefore restrained from rotating. Thus, operation of solenoid 55 and engagement of clutch cups 94 and 93 will hold filter disc 21 in a fixed position preventing gear 87 and shaft 91 from rotating while the solenoid is energized and the field of view is being changed as will be later described.

A balanced transverse rocking arm 98 is provided having a central bearing 92 which rides on shaft 91 but shown in exploded view. Arm 98 may be noted to operate in see-saw fashion between two fixed positions as indicated by arrow G. The two positions are defined by index holes 81 and 82 in the hub of arm 98. When solenoid 55 is in its non-energized position, latch pins 65 will engage either index holes 81 or 82. In FIG. 9, arm 98 is shown such that latch pins 65 will engage index holes 81 and in such position, the figure represents the wide field of view condition of the television optical system. Solenoid armature 97 is constrained from rotating, therefore, latch pins 65 serve to prevent arm 98 from rotating. Arm 98 is attached to WFOV optical assembly 23 on one extremity and, on the other extremity, supports drive motor 53 and position sensor 99, which may be a potentiometer. Motor 53 is geared to filter disc drive gear 87 by pinion gear 89 and idle gear 88, both mounted to arm 98 but shown in an exploded position in the figure.

As may now be recognized, with arm 98 locked in the wide field of view position in FIG. 9, operation of motor 53 will result in rotation of filter disc 21 as shown by arrow K. In normal operation, motor 53 may be servo controlled via an electronic control system to be energized when the light level is either too high or too low. As filter disc 21 moves to the proper filtration to obtain the predetermined light level, motor 53 is deenergized to thereby maintain such light level. Since in the non-operated position of solenoid 55, clutch cups 93 and 94 are maintained apart by spring 95, there is no constraint on the rotation of filter disc 21. When it is desired to change from the wide field of view shown by way of example in FIG. 9 to the narrow field of view, it is necessary to move arm 98 to its second position which removes WFOV lens assembly 23 from the TV optical path. This operation is, in accordance with the invention, performed by energizing solenoid 55 which provides two functions. First, latch pins 65 are withdrawn from index holes 81, freeing arm 98 to rotate about shaft 91. Second, fixed brake cup 94 is pulled rearward to engage filter clutch cup 93 thereby locking filter disc 21 in its current position. Next, the CCW winding of motor 53 is energized to cause rotation of gear 88, engaged with now locked gear 87, to rotate in direction L and to thereby cause arm 98 to move from the wide field of view position to the narrow field of view position as indicated by arrow G. In order to stop arm 98 in the correct position, a shutter 85 is provided having two openings 86a and 86b therein. A light emitting diode (LED) 83 and a photo sensitive detector 84 are shown, with their supporting structure omitted for clarity, such that output from the detector 84 will be obtained only in the two positions in which either of the openings 86 is aligned with the LED and the detector. However, other devices such as limit switches may be used. Thus, as motor 53 rotates arm 98 to the narrow field of view position, opening 86b in shutter 85 will cause suitable switching circuits to deenergize that winding of the motor 53 and to enable the CW winding of motor 53 for a subsequent return of arm 98 to the wide field of view position and to energize signals indicating the field of view in use. When the arm movement stops, solenoid 55 is released, permitting latch pins 65 to engage index holes 82 representative of the narrow field of view position. As will be understood, WFOV optical assembly 23 will have been moved out of the optical center line path of the television optical system and will leave only the narrow field of view optical system 19, previously discussed, in that optical path. Simultaneously, clutch cup 94 is disengaged from clutch cup 93 by spring 95 and filter disc 21 is then free to be driven as required to maintain the desired average light level.

It is required that the switching of the optical system from one field of view condition to the other field of view condition be accomplished in a very short time so as to not interfere with the automatic light level control function of filter disc 21 and to provide continuity of viewing of the target area by the operator. Advantageously, the novel control motor assembly 37 accomplishes the change of field of view in a fraction of a second.

When WFOV optical assembly 23 is in the operated position indicated in FIG. 9, it is imperative that it be rigidly held to prevent any jitter from appearing in the observed images. To this end, latch pins 65 and index openings 81 are provided with spring loading by spring pin 66. As motor 53 is energized to move arm 98 from the narrow field of view position to the wide field of view position, optical assembly 23 contacts spring pin 66, compressing it against a spring. When the motor stops and latch pins 65 enter index openings 81, spring loaded pin 66 forces arm 98 against pins 65 to provide the necessary rigidity. This feature permits index openings 81 to be slightly larger than latch pins 65 to eliminate alignment problems in the indexing assembly.

Figure 10:
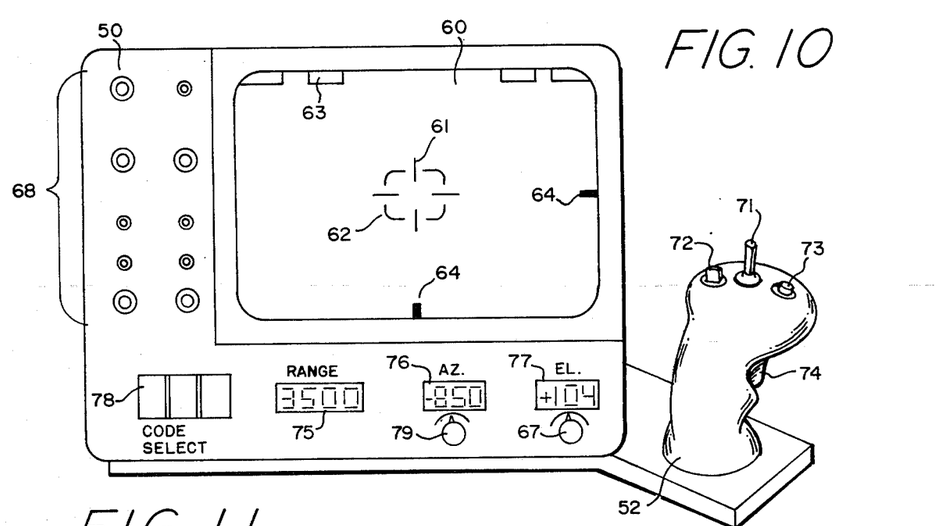
FIG. 10 shows the front view of a typical control panel and TV display, also showing the manual control joy stick.

Having now explained in detail the structure of the preferred embodiment for sight assembly 10, the operation of the system of the invention will be explained with reference to FIGS. 10 and 11. FIG. 10 illustrates a typical control position and FIG. 11 presents a simplified functional block diagram of the control system.

In FIG. 10, TV monitor 60 is shown installed in control panel assembly 50. The TV monitor may be a Conrac 8", high-resolution monitor. TV tracker 54 in FIG. 11 generates a rectangular tracking window 62 which appears on the display monitor 60. In addition, crosshairs 61 are generated in which a target will be centered when the system is in automatic tracking operation. Video circuits 54 generate four "field of view" bars 63 spaced across the top of the display with a bar illuminated to represent which of the four field of views of the system is in use at a given time. Additionally, tic marks 64 are generated which may appear on one side of the screen and along the bottom of the screen. These tic marks are moved according to the azimuth and elevation gimbal position of gyro assembly 14 and will therefore indicate to the operator the position of the line of sight of the sight assembly 10 with respect to the line of sight of the aircraft. Control panel 50 contains a series of push button switches and indicator lamps 68 along the left side thereof. These switches control the system power, the laser power, and permits selection of a directed or stabilized mode. Control lamps indicate conditions of boresight, laser operation, and other supervisory functions. A code select switch 78 controls laser encoder 69 in FIG. 11 to permit the proper triservice code for the laser pulse repetition frequency to be selected. Digital readout 75 displays the range of a target in meters; azimuth readout 76 provides a digital readout of target azimuth in degrees; and elevation readout 77 provides the target elevation in degrees. Azimuth potentiometer 79 and elevation potentiometer 67 permit manual control of the sight in azimuth and elevation.

Figure 11:
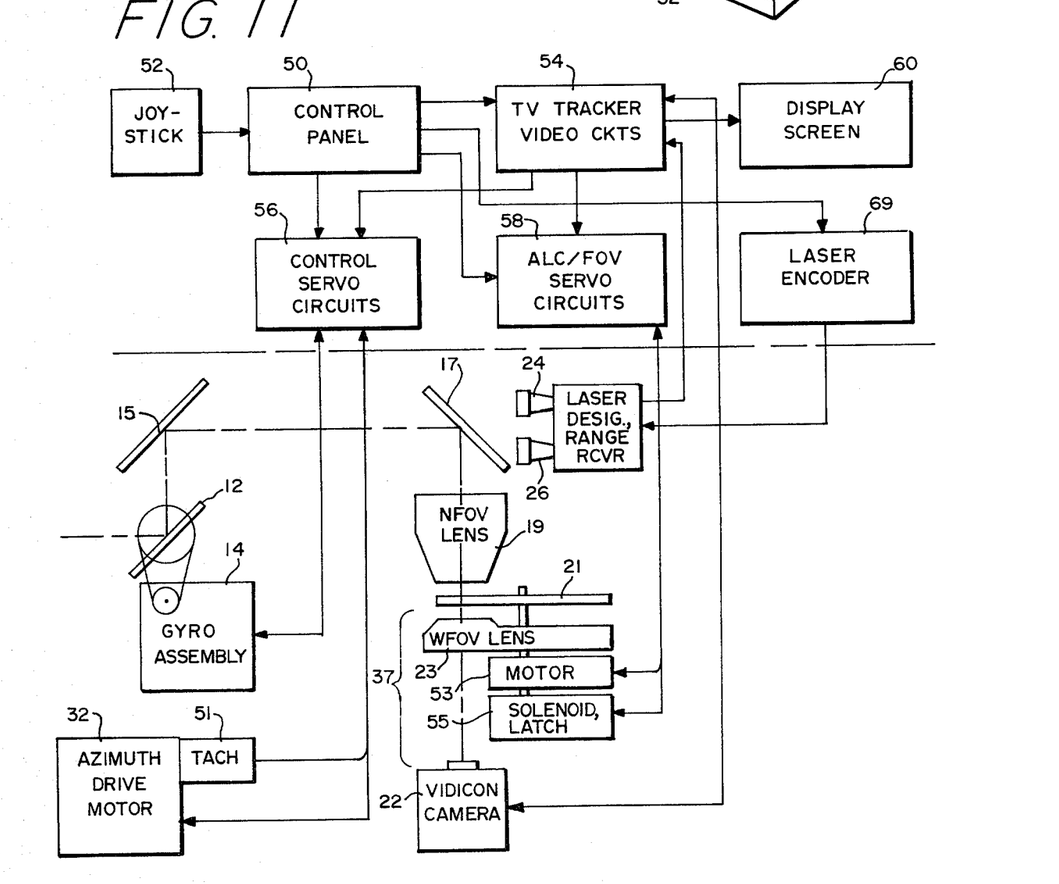
FIG. 11 is a simplified functional diagram of the overall system of the invention illustrating the control electronics portions connected to the elements of the sight assembly.

As shown in FIG. 11, control servo circuits 56 control the gyro assembly 14, energizing the torquer motors for slewing of the gimbals as required and receiving position and rate information from the pickoffs in gyro assembly 14. When slewing in azimuth of greater than ±2° is required, servo circuits 56 control the azimuth drive motor 32 which serves to rotate the entire sight turret to the required azimuth heading. Control of gyro assembly 14 and azimuth drive motor 32 may be in either the directed or stabilized mode. In the directed mode, the line-of sight of the sight is slaved to the airframe and will change with changes in attitude of the aircraft. The line-of-sight may be adjusted relative to the aircraft heading by means of azimuth potentiometer 79 and elevation potentiometer 67 on panel 50. In the stabilized mode, the azimuth and elevation gyros in gyro assembly 14 act as a platform in free space with respect to mirror 12 and the line of sight of the optical and laser systems will remain fixed in space as the aircraft maneuvers. Pickoff signals from gyro assembly 14 are processed by control servo circuits 56 which then control the torquers and azimuth drive motor 32 to maintain the platform fixed in space. The operator may override the stabilized control by using the joystick thumb controller 71. Controller 71 may be operated in both the X and Y directions to provide control signals to servo circuits 56. The operator, by pushing controller 71 up or down with his thumb, may thus control the field of view of the sight in elevation and, by pressure to the right or left, may control the field of view in azimuth. Switch 73 is a two-position switch which may be pushed down to decrease the field of view. Switch 72 is utilized when the system is in the automatic track mode and may select whether the tracker is operated on a black-on-white or on a white-on-black type of target.

The operator may select either manual or automatic light control. When in the automatic light control mode, ALC servo circuits 58 will energize motor 53 to rotate filter disc 21 with feedback obtained from video circuits 54 which measure the peak light level of the television scene. Thus, motor 53 will stop when the proper density portion of filter disc 21 is in the optical path. Operation of the field-of-view circuits is by means of switch 73 that controls servo circuits 58. Solenoid 55 is operated which brakes filter disc 21 and unlatches WFOV lens 23 as previously described to permit motor 53 to move lens 23 in or out of the optical path as required.

When the system power is first turned on by operation of the appropriate switch on control panel 50, the boresight sequence is automatically operated which causes the gimbals to slew to their stops, mirror 12 in the sight assembly 10 to reflect the laser beam to the corner reflector 18 in which it is reflected back to the vidicon. TV tracker circuits 54 then automatically track on the laser image, generating error signals which move the raster to accurately center the laser. A momentary contact switch is also provided which allows the operator to manually enter the system into the boresight mode at any time if an indication of a problem occurs. The TV tacking system uses the well known balanced area tracker technique which develops error signals proportional to the displacement of a target image from the center of the television field of view. These error signals are fed to the servo system to cause the gimbal to move the camera field of view so as to bring the target to the center of the field of view and of the mirror. The operator may manually slew the turret line-of-sight to place a target in the center of the crosshairs 61 on display 60 by use of switch 71 on joystick 52. A tracking window 62 represented by corner tic marks and centered on the crosshairs 61 will then automatically expand to cover the target area. The target area may be either a white area surrounded by a darker background or a dark area surrounded by a lighter background with at least 10% contrast therebetween. It is also necessary that the target cover at least 12 television scanning lines in height. After the operator has centered the target, the automatic tracking system will cause the system to lock onto the target and track as the target or airframe moves. After TV tracker 54 has locked onto a desired target centered in crosshairs 61, the operator may obtain range information by use of joystick trigger switch 74 which has two positions. The first position will cause the laser to fire at one pulse per second and the laser ranger 26 will then provide a range measurement which will appear on range readout 75. When trigger switch 74 is closed to its second position, the laser designator 24 will fire using the code selected by select switch 78, and ranging and designation of target will occur.

An optical sight system has been described having in combination a number of features that advantageously greatly reduce the weight of the sight assembly to permit mast mounting above the plane of a helicopter rotor. The system includes gyro stabilization of an exit mirror in the sight assembly rather than stabilizing the entire sight assembly. Control and display elements are provided to permit manual or automatic tracking of targets and a laser system is provided for target range measurement and for target designation to permit guided ordnance to be used. Although particular elements are described in detail, it is to be understood that such description is for exemplary purposes only and that many variations, substitutions, and changes may be made by those of skill in the art. Such variations are considered to be within the scope of the invention as defined by the claims.

We claim:

1. In an optical sight for a target acquisition and tracking system having a two-axis gyroscope in a system for stabilizing a mirror, a laser designator, a laser ranger, and a television camera, the improvement comprising:

a unitary optical bed having a fore and aft axis;

a pair of gimbal support brackets integral with said optical bed;

a first gyroscope gimbal for said two axis gyroscope having a horizontal central axis and pivots along said central axis, said pivots rotatably supported by said pair of gimbal support brackets;

first optical means supported by said optical bed for directing a laser beam from said laser designator to said mirror whereby such beam is reflected along said fore and aft axis for designating a target, for directing a laser beam reflected from a target to said laser ranger via said mirror, and for directing an optical image on said mirror to said television camera;

a pair of optical means support brackets integral with said optical bed; and second optical means having an adjustable density optical filter, a narrow field of view lens system, and a movable wide field of view lens system; said narrow field of view lens system, said wide field of view lens system, and said optical filter supported by said optical means support brackets and disposed in said optical path to said television camera; said optical means including drive means for selectively adjusting said optical filter to vary the average light intensity at said television camera and selectively moving said wide field of view lens system in and out of said optical path.

2. The sight as defined in claim 29 which further characterized by:

housing means (25) for enclosing said optical sight (10); and window means (13) mounted essentially normal to said fore and aft axis and adjacent to said mirror (12).

3. The sight as defined in claim 1 which further comprises:

second gyroscope gimbal supported by said first gimbal and pivoted about a vertical axis; and said mirror being is pivotably mounted in said first gimbal and operatively connected to said second gimbal whereby said gyroscope maintains said mirror stabilized in a selected attitude.

4. The sight as defined in claim 3 in which said mirror (12) is connected to said second gimbal means (40) by pulley (44, 45) and belt (46) means.

5. The sight as defined in claim 3 which further comprises:

boresight adjustment means for aligning the laser beam from said laser designator with the center of the television camera scanning frame.

6. The sight as defined in claim 4 in which said gyroscope has about ±2° freedom in azimuth and about 15° freedom in elevation.

7. The sight as defined in claim 1 in which:
said first optical means (16) includes a second mirror (15) disposed adjacent to said stabilized mirror (12); and
a beam splitter (17) disposed between said second mirror (15) and said laser designation (24) and ranging (26) means, said beam splitter (17) transparent to said laser beam and at least partially reflective to the light forming the optical image;
whereby said second mirror (15) reflects a laser beam reflected from a target reflected from said stabilized mirror (12) to said laser ranging means (26) via said beam spliter (17), and reflects said laser beam from said laser designation means (24) to said stabilized mirror (12).

8. The sight as defined in claim 7 in which said beam splitter (17) is reflective to light energy in the range of about 0.7 to 0.9 microns and transparent to light energy of about 1.06 microns.

9. The sight as defined in claim 1 in which:
said narrow field of view lens system (19) has a field of view of about 2.5°; and
said wide field of view lens system (21) produces a field of view for said sight of about 10°.

10. The sight as defined in claim 9 in which said adjustable density optical filter (21) has a dynamic illumination range of at least 1,000 to 1.

11. The sight as defined in claim 9 in which said adjustable density optical filter (21) has a spectral transmission range of about 0.68 to 1.1 microns.

12. The sight as defined in claim 1 which further comprises a vertical mounting mast and azimuth drive means for rotating said sight in azimuth.

13. The sight as defined in claim 12 in which said azimuth drive means (31) is controllable over about ±160° in azimuth.

14. The sight as defined in claim 12 in which said azimuth drive means (31) includes azimuth drive motor (32), drive shaft (30), and gear train (34, 36).

15. In an optical sight for a target acquisition and tracking system having a gyro stabilized mirror and a television camera, the improvement comprising:
an optical bed;
optical means supported by said optical bed for directing an optical image incident on said mirror to said television camera, said optical means having a narrow field of view lens system and a movable wide field of view lens system defining an optical path between said mirror and said television camera;
first and second support brackets integral with said optical bed;
a rotatable, transparent filter disc in said optical path having a neutral density filter characteristic continuously variable over a preselected range, a shaft and hub attached concentrically with said filter disc, said shaft and hub rotatably mounted to said second support bracket;
gear driving means operatively attached to said shaft;
drive motor means coupled to said gear driving means for selectively rotating said optical filter disc and for selectively moving said wide field of view lens system in and out of said optical path; and
a clutch assembly attached to said optical filter disc and to said first support bracket, said clutch assembly adapted to be in a released position during rotation of said optical filter disc.

16. The sight as defined in claim 15 in which said drive motor means comprises:
a transverse rocking arm mounted on and rotatable about said shaft;
reversible drive motor mounted at one distal end of said arm;
drive train assembly operatively connected to said motor and engaged with said gear driving means;
said wide field of view lens system mounted on the other distal end of said arm;
third support bracket integral with said optical bed;
solenoid means supported by said third support bracket for engaging said clutch means to thereby restrain said optical filter disc from rotating; and
indexing means responsive to operation of said solenoid means and said drive motor for maintaining said wide field of view lens system either in a first position in the optical path of said television camera or in a second position out of the optical path of said television camera.

17. The sight as defined in claim 16 in which said indexing means includes:
indexing pin assembly (57, 65);
first position index holes (81) in said arm (98);
second position index holes (82) in said arm (98); and
further comprises arm position control means (85, 83, 84, 86a, 86b);
whereby operation of said solenoid means (55, 97, 59) engages said clutch (93, 95, 94) thereby preventing rotation of said disc and withdrawing said index pins (65), causing said drive motor (53) to drive said drive train assembly (89, 88) against now stationary said gear driving means (87) to rotate said arm (98) on said shaft (9) to a point at which said arm position control means (83, 84, 85, 86a, 86b) indicates a desired position thereby stopping motor (53) and releasing said solenoid means (55, 97, 59) permitting said pins (80) to engage said position index holes (82) or (81).

18. The sight as defined in claim 17 in which said arm position control means includes:
shutter plate (85) attached to said arm and rotatable therewith;
first limit hole (86a) at one end of said shutter plate (85) and second limit hole (86b) at the opposite end of shutter plate (85);
a light source (83) aligned with said limit holes (86a, 86b); and
light detector (84) disposed in opposition to said light source (83) and responsive thereto when either of said limit holes (86a, 86b) are coincident with said light source (83).

19. The sight as defined in claim 17 in which said indexing means further includes spring loaded pin means (6) adapted to be depressed by said wide field of view lens systems (23) in its first position to provide bias to said pins (65) when engaged with said first position index holes (81) for providing stability thereto.

20. An optical sight of lightweight construction adapted for mounting on an extensible vertical mast and having a mirror stabilized by a gyroscope, and a television camera, comprising:

an optical bed having a plurality of integral, vertical support brackets;

a first gimbal of said gyroscope supported by a first pair of said support brackets and rotatable in elevation;

a second gimbal supported within said first gimbal and rotatable in azimuth, said second gimbal operatively coupled to said mirror for maintaining stabilization thereof in a selected attitude;

a narrow field of view lens system disposed in an optical path between said mirror and said television camera and supported by one of said support brackets whereby an image reflected by said mirror is focused on said television camera;

an optical assembly having a single drive motor, a wide field of view lens system and an adjustable variable density optical filter, said optical filter disposed in said optical path, said optical assembly supported by a second pair of said support brackets, said drive motor adapted to move said wide field of view lens system in and out of said optical path in a first mode of operation and to adjust the density of said optical filter in a second mode of operation; and control means supported by one of said support brackets for selecting either said first mode or said second mode of operation of said drive motor.

* * * * *